United States Patent
Kim

(10) Patent No.: US 10,100,937 B2
(45) Date of Patent: Oct. 16, 2018

(54) LINE BLIND VALVE

(71) Applicant: SAMMI MACHINERY CO., LTD., Miryang-si, Gyeongsangnam-do (KR)

(72) Inventor: Byeong-ryong Kim, Miryang-si (KR)

(73) Assignee: SAMMI MACHINERY CO., LTD. (KR)

( * ) Notice: Subject to any disclaimer, the term of this patent is extended or adjusted under 35 U.S.C. 154(b) by 117 days.

(21) Appl. No.: 15/249,950

(22) Filed: Aug. 29, 2016

(65) Prior Publication Data

US 2016/0369900 A1 Dec. 22, 2016

Related U.S. Application Data

(63) Continuation of application No. PCT/KR2015/003789, filed on Apr. 15, 2015.

(30) Foreign Application Priority Data

Jul. 8, 2014 (KR) ........................ 10-2014-0084906

(51) Int. Cl.
*F16K 3/312* (2006.01)
*F16K 3/02* (2006.01)
(Continued)

(52) U.S. Cl.
CPC ............ *F16K 3/312* (2013.01); *F16K 3/0218* (2013.01); *F16K 3/0227* (2013.01); *F16K 3/18* (2013.01); *F16L 55/105* (2013.01)

(58) Field of Classification Search
CPC ...... F16K 3/312; F16K 3/0218; F16K 3/0227; F16K 3/18
(Continued)

(56) References Cited

U.S. PATENT DOCUMENTS 3,891,146 A * 6/1975 Blazek .................... F16L 41/00
138/94.3
5,042,531 A * 8/1991 Foster ....................... G01F 1/42
138/40
(Continued)

FOREIGN PATENT DOCUMENTS

JP 2719680 B2 2/1998
KR 20-0218269 Y1 3/2001
(Continued)

OTHER PUBLICATIONS

International Search Report(PCT/KR2015/003789), WIPO, dated Jul. 13, 2015.

*Primary Examiner* — Craig Schneider
*Assistant Examiner* — David Deal
(74) *Attorney, Agent, or Firm* — Park & Associates IP Law, P.C.

(57) ABSTRACT

A line blind valve installed between pipes to open or block a pipeline, in which the line blind valve includes: a valve body having opening portions formed at front and rear sides thereof, respectively; a front sheet formed from the opening portion of the front side toward an inside of the valve body, and a rear sheet formed from the opening portion of the rear side toward the inside of the valve body; an opening blind installed during opening of the pipeline and a blocking blind installed during blocking of the pipeline, the opening and blocking blinds being inserted between the front and rear sheets; and a gear unit coupled to the rear sheet in a threaded manner, and configured to press the opening blind or the blocking blind toward the front sheet by moving forward so that the opening or the blocking blind is fixed to the front sheet, and is sealed.

3 Claims, 5 Drawing Sheets

(51) Int. Cl.
*F16K 3/18* (2006.01)
*F16L 55/105* (2006.01)

(58) Field of Classification Search
USPC .................................. 138/94.3, 94; 251/158
See application file for complete search history.

(56) References Cited

U.S. PATENT DOCUMENTS

| | | | | |
|---|---|---|---|---|
| 5,094,272 | A | * | 3/1992 | Foster ........................ G01F 1/42 |
| | | | | 138/44 |
| 5,305,796 | A | * | 4/1994 | Klak .......................... G01F 1/42 |
| | | | | 138/40 |
| 5,464,035 | A | * | 11/1995 | Heinecke .............. F16K 3/0281 |
| | | | | 137/312 |
| 7,413,163 | B2 | * | 8/2008 | Maxwell ............... F16K 3/0254 |
| | | | | 251/250 |
| 7,780,143 | B2 | * | 8/2010 | Shibata ..................... F16K 3/20 |
| | | | | 251/193 |

FOREIGN PATENT DOCUMENTS

| | | |
|---|---|---|
| KR | 10-0357940 B1 | 10/2002 |
| KR | 20-0295899 Y1 | 11/2002 |
| KR | 20-0310660 Y1 | 4/2003 |
| KR | 10-0907816 B1 | 7/2009 |

\* cited by examiner

LINE BLIND VALVE

REFERENCE TO RELATED APPLICATIONS

This is a continuation of pending International Patent Application PCT/KR2015/003789 filed on Apr. 15, 2015, which designates the United States and claims priority of Korean Patent Application No. 10-2014-0084906 filed on Jul. 8, 2014, the entire contents of which are incorporated herein by reference.

FIELD OF THE INVENTION

The present invention relates generally to a line blind valve. More particularly, the present invention relates to a line blind valve for controlling fluid flow by being connected to a pipe of a vessel or plant.

BACKGROUND OF THE INVENTION

In general, a line blind valve is located on a boundary of a pipe for a hydraulic test, and is configured to block and open fluid flow of a pipe. Furthermore, the line blind valve is installed in pipes for different types of fluids so as to prevent the fluids from being introduced into each other or to prevent the fluids from being mixed with each other. Usually, the line blind valve is utilized in pipes of a vessel or plant.

As shown in FIG. 1, in a line blind valve according to the related art, in order to block a pipeline, an upper cover 20 of a valve body 10 provided between pipes is opened, and a double disk 30 is inserted into the valve body 10. Thereafter, the upper cover 20 is closed. In order to open the pipeline, the upper cover is opened, and the double disk 30 is separated from the valve body 10. Thereafter, the upper cover 20 is closed.

It is problematic in that the line blind valve according to the related art requires a dedicated device since it is hard to lift weight of the double disk 30 by human power, thereby increasing time required to insert or separate the double disk 30.

Furthermore, in the line blind valve according to the related art, since dead space is formed between the double disk 30 and the valve body 10, it is problematic in that different types of fluids are mixed or are gathered in the dead space, thereby contaminating the fluids.

Furthermore, in the line blind valve according to the related art, when the double disk 30 is separated from the valve body 10 so as to open the pipeline, since pressure generated by fluid flow is applied to the entire valve body 10, it is complicated to design the valve body 10 to be sealed. Thus, it is problematic in that weight of the valve body 10 is increased.

Accordingly, a line blind valve for solving the above-mentioned problems is required.

SUMMARY OF THE INVENTION

Accordingly, the present invention has been made keeping in mind the above problems occurring in the related art, and an object of the present invention is to provide a line blind valve in which during opening or blocking of a pipeline, weight of a blind can be reduced by alternately using opening and blocking blinds, time required to open and block the pipeline can be reduced, and dead space can be fundamentally prevented from being formed.

Another object of the present invention is to provide a line blind valve in which only a blind and components for fixing the blind are sealed, thereby achieving a simply designed and compact valve body.

In order to accomplish the above object, the present invention provides a line blind valve installed between pipes so as to open or block a pipeline, the valve including: a valve body having opening portions formed at front and rear sides thereof, respectively; a front sheet formed from the opening portion of the front side toward an inside of the valve body, and a rear sheet formed from the opening portion of the rear side toward the inside of the valve body; an opening blind installed during opening of the pipeline and a blocking blind installed during blocking of the pipeline, the opening and blocking blinds being inserted between the front and rear sheets; and a gear unit coupled to the rear sheet in a threaded manner, and configured to press the opening blind or the blocking blind toward the front sheet by moving forward so that the opening blind or the blocking blind is fixed to the front sheet, and is sealed.

Furthermore, a first threaded portion may be formed on a side of an outer circumferential surface of the rear sheet, and a stepped portion may be formed in front of the first threaded portion.

Furthermore, the gear unit may include: a ring gear coupled to the first threaded portion, and configured to move forward and backward depending on rotation of the ring gear; a ring sheet coupled to the ring gear, and configured to press the opening blind or the blocking blind toward the front sheet by moving forward along the stepped portion so that the opening blind or the blocking blind is fixed to the front sheet; a lever formed on an outer circumferential surface of the ring gear, and configured to rotate the ring gear by moving forward and backward; and a screw shaft of which a first side is coupled to the lever, and a second side is coupled to the valve body in a threaded manner, the screw shaft being rotated to move the lever forward and backward, thereby rotating the ring gear.

Furthermore, first gaskets may be provided on first surfaces of the opening and blocking blinds, respectively, the first surfaces facing the front sheet, and second gaskets may be provided on second surfaces of the opening and blocking blinds, respectively, the second surfaces facing the ring sheet, so that when the opening blind is pressed toward the front sheet by the ring sheet, a gap between the opening blind and the front sheet and a gap between the opening blind and the ring sheet are sealed by pressing the first gasket and the second gasket, or when the blocking blind is pressed toward the front sheet by the ring sheet, a gap between the blocking blind and the front sheet and a gap between the blocking blind and the ring sheet are sealed by pressing the first gasket and the second gasket.

Furthermore, a third gasket may be provided at a rear end of a lower surface of the ring sheet so that when the opening blind or the blocking blind is pressed by the ring sheet depending on forward movement of the ring gear, the ring gear presses the third gasket, thereby sealing a gap between the stepped portion and the ring gear.

The present invention having the above-mentioned configuration is advantageous as follows.

In the present invention, weight of a blind can be reduced, time required to open and block a pipeline can be reduced, and dead space can be fundamentally prevented from being formed, thereby increasing working efficiency and product reliability.

Furthermore, the line blind valve of the present invention can be easily and simply manufactured by achieving a simply designed and compact valve body.

DETAILED DESCRIPTION OF THE INVENTION

Hereinbelow, exemplary embodiments of the present invention will be described in detail with reference to the accompanying drawings.

Figure 1:
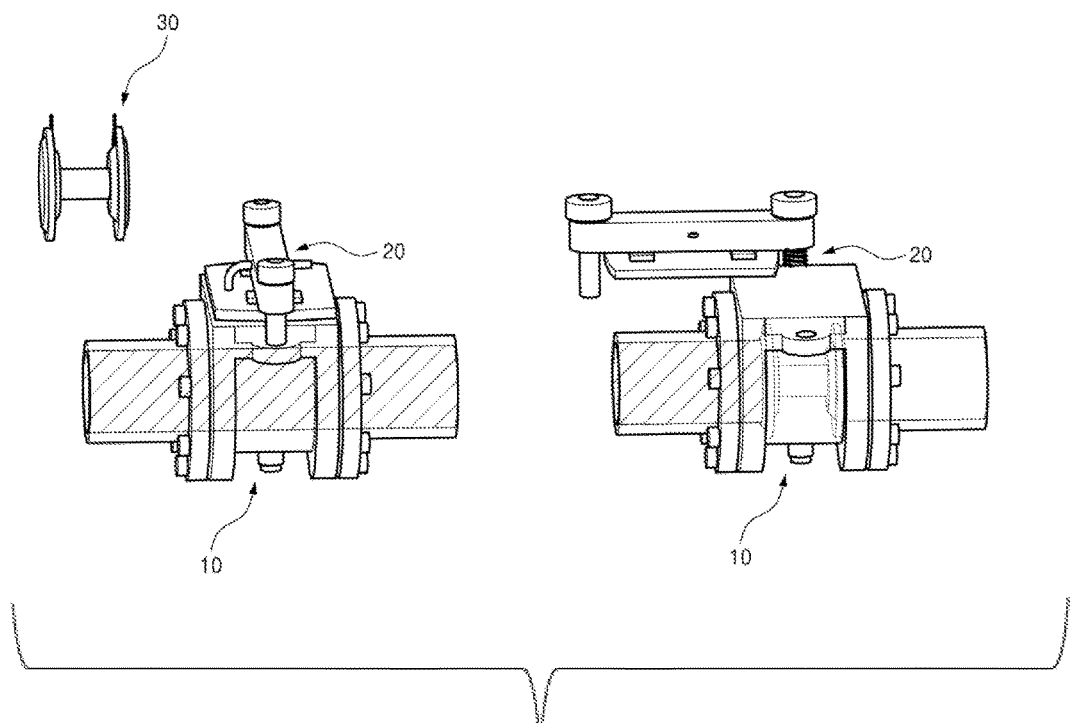
FIG. 1 is a view illustrating a line blind valve according to the related art.
Figure 2:
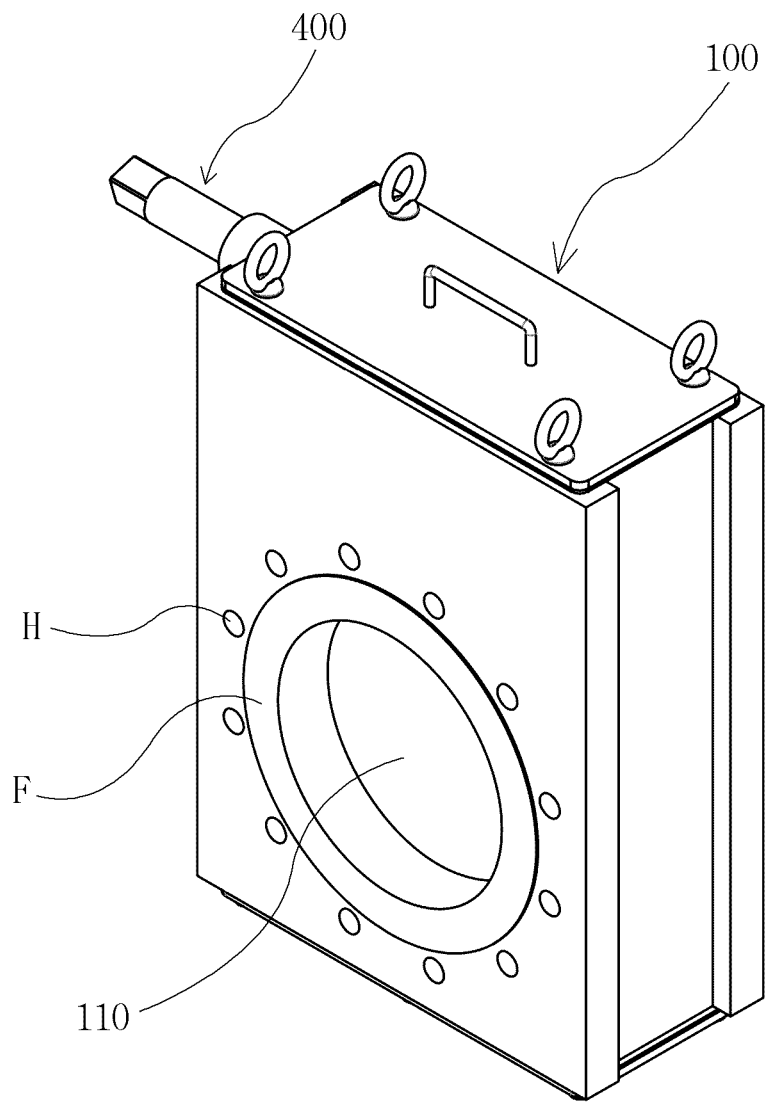
FIG. 2 is a perspective view illustrating a line blind valve according to the present invention.
Figure 3:
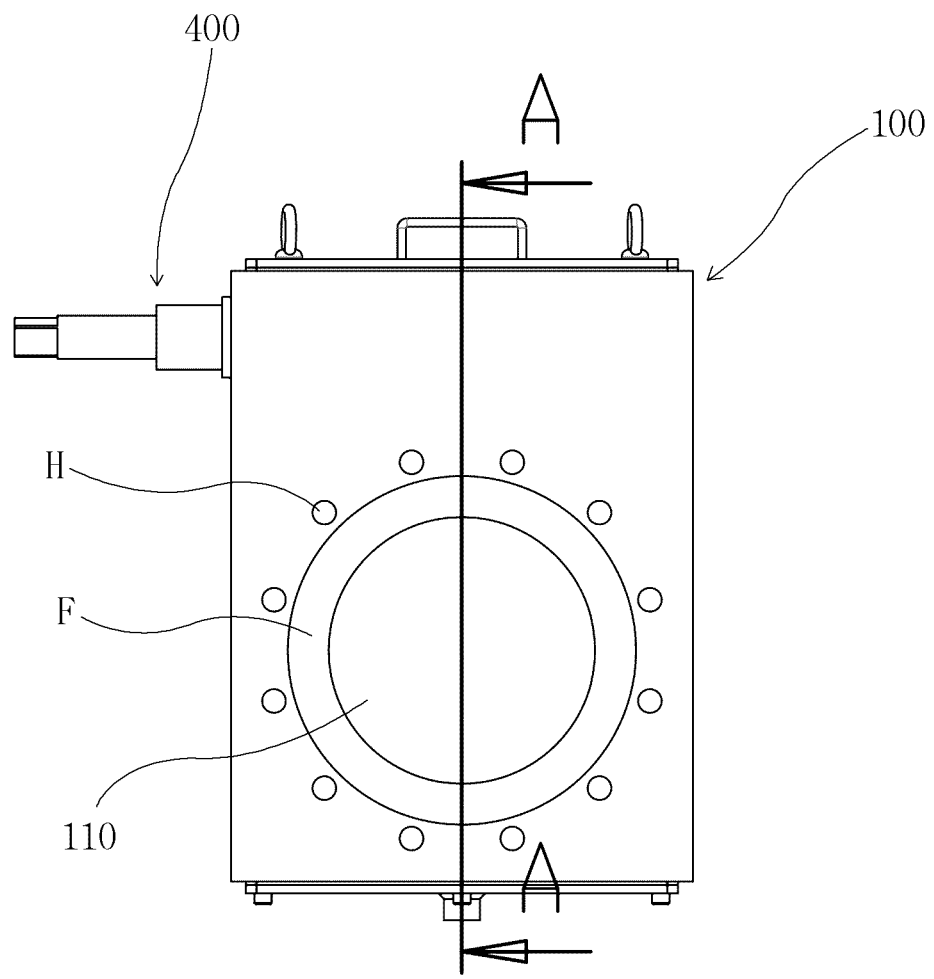
FIG. 3 is a side view illustrating the line blind valve according to the present invention.
Figure 4:
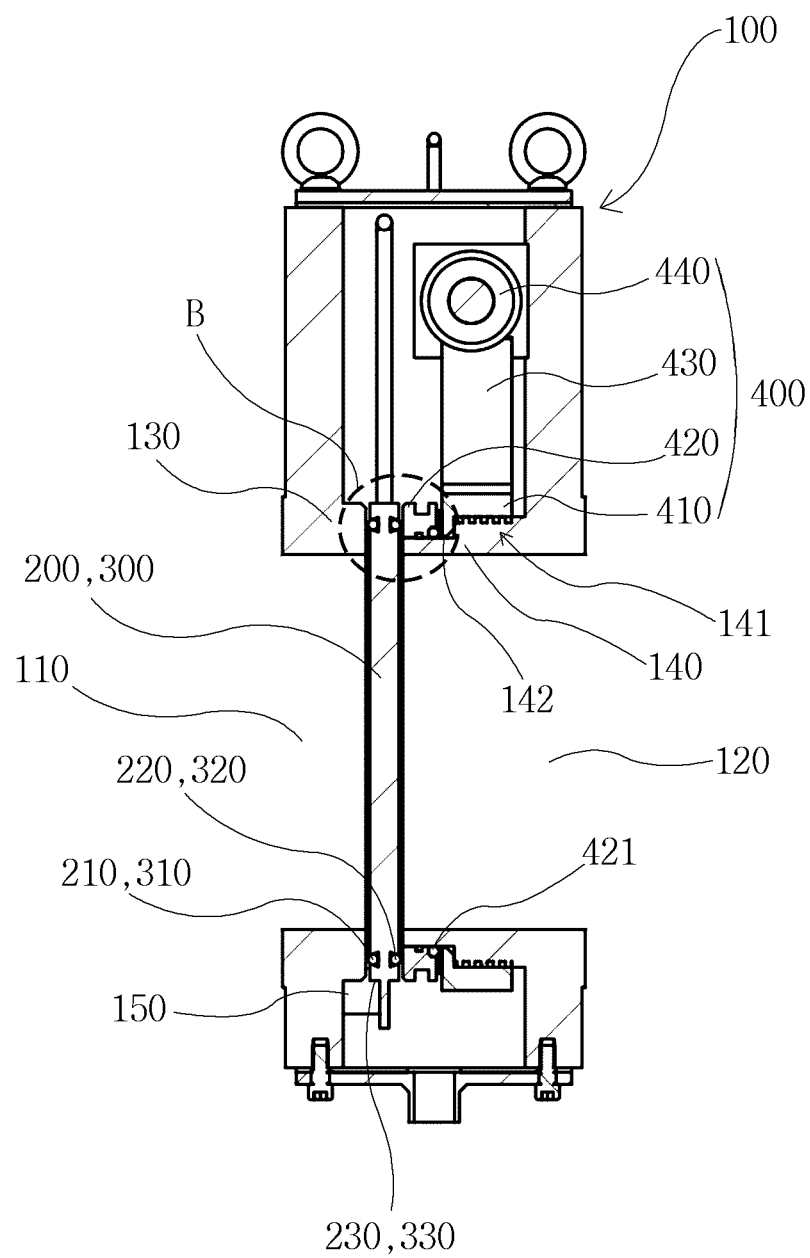
FIG. 4 is a sectional view taken along line A-A of FIG. 3.

As shown in FIGS. 2 and 3, which are perspective and side views illustrating a line blind valve according to the present invention, and as shown in FIG. 4, which illustrates a sectional view taken along line A-A of FIG. 3, the present invention relates to the line blind valve installed between pipes so as to open or block a pipeline for maintenance of the pipeline or for urgently blocking the pipeline in case of emergency. The line blind valve includes a valve body 100, an opening blind 200, a blocking blind 300, and a gear unit 400.

The valve body 100 is installed between pipes, and the opening blind 200 or the blocking blind 300 is inserted into the valve body 100 so as to open or block the pipeline. The valve body 100 is formed in a container shape of which upper and lower portions are open so that upper and lower covers may be attached to or detached from the upper and lower portions of the valve body 100, respectively. It is desirable that the upper and lower covers (no reference symbols) are detachably coupled to the upper and lower portions of the valve body 100. Opening portions 110 and 120 for being connected to pipes are formed at front and rear sides of the valve body 100, respectively. Further, the opening blind 200 or the blocking blind 300 is inserted into the valve body 100.

Furthermore, a flange F for being coupled to a pipe is formed on the circumference of each of the opening portions 110 and 120 formed at the front and rear sides of the valve body 100. Further, it is desirable that a plurality of bolt holes H for being coupled to a pipe is formed around the flange F.

Furthermore, front and rear sheets 130 and 140 are formed in the valve body 100. The front sheet 130 formed in a pipe shape is formed by protruding from the opening portion 110 of the front side toward an inside of the valve body 100, and the rear sheet 140 formed in a pipe shape is formed by protruding from the opening portion 120 of the rear side toward the inside of the valve body 100. Further, a first threaded portion 141 comprising a plurality of threads is formed on a side of an outer circumferential surface of the rear sheet 140, and a stepped portion 142 is formed in front of the first threaded portion 141.

Thereafter, the opening blind 200 is inserted between the front and rear sheets 130 and 140 during the opening of the pipeline so that the valve body 100 may open the pipeline. In this case, an opening corresponding to the opening portions 110 and 120 is formed in the opening blind 200.

Further, a blocking blind 300 is inserted between the front and rear sheets 130 and 140 during the blocking of the pipeline so that the valve body 100 may block the pipeline.

In this case, stepped portions 230 and 330 are formed in lower portions of the opening and blocking blinds 200 and 300, respectively. A support 150 by which the stepped portions 230 and 330 are stopped and supported is provided in a lower portion of the front sheet 130. Thus, the opening blind 200 or the blocking blind 300 may be located between the front and rear sheets 130 and 140 in such a way that the opening blind 200 or the blocking blind 300 is supported by the support 150.

Furthermore, as shown in FIGS. 2 to 4, and FIG. 5 which is an enlarged view of B in FIG. 4, the gear unit 400 is coupled to the rear sheet 140 in a threaded manner, and is configured to press the opening blind 200 or the blocking blind 300 toward the front sheet 130 by moving forward so that the opening blind 200 or the blocking blind 300 is fixed to the front sheet 130, and is sealed. The gear unit 400 includes a ring gear 410, a ring sheet 420, a lever 430, and a screw shaft 440.

A second threaded portion 411 is formed on an inner circumferential surface of the ring gear 410 such that the second threaded portion 411 is coupled to the first threaded portion 141. Thus, the ring gear 410 may move forward and backward depending on rotation of the ring gear 410 along the first threaded portion 141.

Furthermore, the ring sheet 420 is coupled to a front end of the ring gear 410, and is configured to press the opening blind 200 or the blocking blind 300 toward the front sheet 130 by moving forward along an outer circumferential surface of the stepped portion 142 so that the opening blind 200 or the blocking blind 300 is fixed to the front sheet 130.

In this case, a projection 412 is formed at the front end of the ring gear 410, and a groove 421 into which the projection 412 is inserted is formed on an upper portion of the ring sheet 420. Thus, the ring gear 410 and the ring sheet 420 may be coupled to each other.

Furthermore, a lever 430 is formed on an outer circumferential surface of the ring gear 410, and is configured to rotate the ring gear 410 by moving forward and backward.

Furthermore, a screw shaft 440 of which a first side is coupled to the lever 430, and a second side is coupled to the valve body 100 in a threaded manner such that the screw shaft 440 is rotated to move the lever 430 forward and backward. More particularly, a pair of binding rings (not shown) are installed in a state of being spaced apart from each other on an outer circumferential surface of the first side of the screw shaft 440, and an end of the lever 430 is inserted into space formed between the pair of binding rings.

As described, a sealed structure of the line blind valve according to the present invention will be described as follows.

First gaskets 210 and 310 are provided on first surfaces of the opening and blocking blinds 200 and 300, respectively, such that the first surfaces face the front sheet 130, and second gaskets 220 and 320 are provided on second surfaces of the opening and blocking blinds 200 and 300, respectively, such that the second surfaces face the ring sheet 420.

When the opening blind 200 is pressed toward the front sheet 130 by the ring sheet 420 depending on forward movement of the ring gear 410, a gap between the opening blind 200 and the front sheet 130 and a gap between the opening blind 200 and the ring sheet 420 may be sealed by pressing the first gasket 210 and the second gasket 220, or when the blocking blind 300 is pressed toward the front sheet 130 by the ring sheet 420 depending on forward movement of the ring gear 410, a gap between the blocking blind 300 and the front sheet 130 and a gap between the blocking blind 300 and the ring sheet 420 may be sealed by pressing the first gasket 310 and the second gasket 320.

Figure 5:
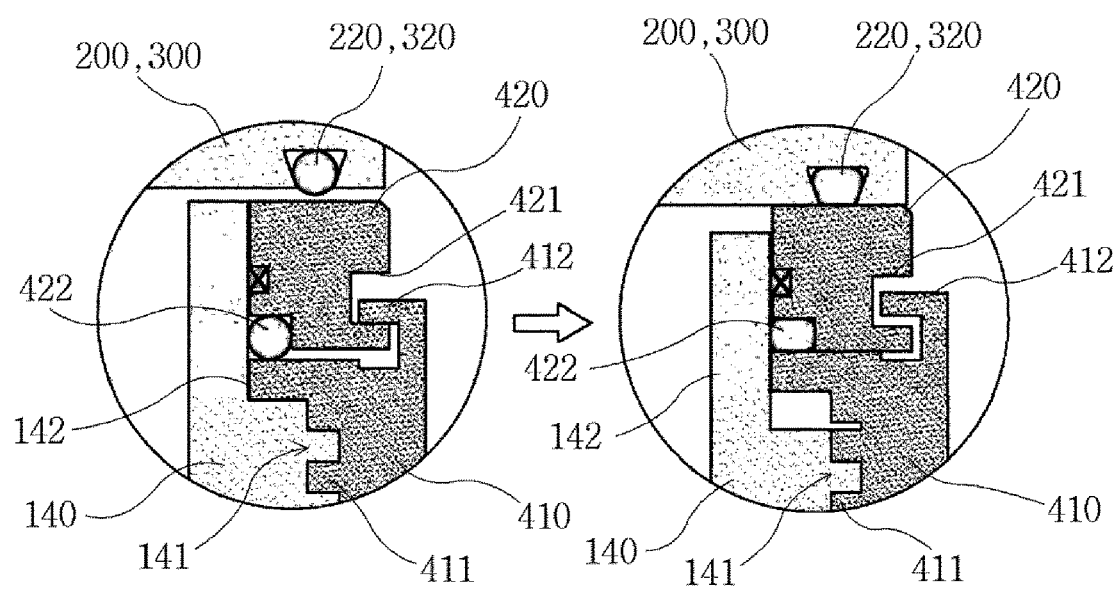
FIG. 5 is an enlarged view of B in FIG. 4.

Furthermore, as shown in FIG. 5, a third gasket 422 is provided at a rear end of a lower surface of the ring sheet 420 so that when the opening blind 200 or the blocking blind 300 is pressed by the ring sheet 420 depending on forward movement of the ring gear 410, the ring gear 410 presses the third gasket 422, thereby sealing a gap between the stepped portion 142 and the ring gear 410.

As described, compared to a line blind valve according to the related art that is sealed overall, the simply designed and compact valve body 100 may be achieved by sealing the gap between the opening blind 200 and the ring sheet 420 or the gap between the blocking blind 300 and the ring sheet 420.

Hereinafter, opening and blocking processes of the pipeline by the line blind valve according to the present invention will be described as follows.

First, during the opening of the pipeline, after the upper cover is separated from the valve body 100, the opening blind 200 is inserted between the front and rear sheets 130 and 140. Thereafter, when the screw shaft 440 is rotated by using a jig, such as a wrench, so as to move the lever 430 forward, the ring gear 410 is moved forward by rotating. Thereafter, the ring sheet 420 presses the opening blind 200 toward the front sheet 130 so that the opening blind 200 is fixed to the front sheet 130. Thereafter, the upper cover is coupled to the valve body 100, and the pipeline continues to be open.

Second, during the blocking of the pipeline, after the upper cover is separated from the valve body 100, the screw shaft 440 is reversely rotated so as to move the lever 430 backward. Thereafter, the ring gear 410 is moved backward by rotating, and the ring sheet 420 is spaced apart from the opening blind 200. Thereafter, the opening blind 200 is separated from the valve body 100, and the blocking blind 300 is inserted between the front and rear sheets 130 and 140. Thereafter, the screw shaft 440 is rotated so as to move the lever 430 forward, and the ring sheet 420 presses the blocking blind 300 toward the front sheet 130 so that the blocking blind 300 is fixed to the front sheet 130. Thereafter, the upper cover is coupled to the valve body 100, and the pipeline continues to be blocked.

As described, in the technical spirit of the line blind valve according to the present invention, during the opening and blocking of the pipeline, weight of a blind may be reduced by alternately using the opening and blocking blinds, and time required to open and block the pipeline may also be reduced. Further, dead space may be fundamentally prevented from being formed, and only the blind and components for fixing the blind are sealed, thereby achieving the simply designed and compact valve body.

Although the preferred embodiments of the present invention have been disclosed for illustrative purposes, those skilled in the art will appreciate that various modifications, additions and substitutions are possible, without departing from the scope and technical spirit of the present invention as disclosed in the accompanying claims.

The present invention relates to a field of a line blind valve that may be utilized for controlling fluid flow by being connected to pipes of a vessel or plant.

What is claimed is:

1. A line blind valve installed between pipes so as to open or block a pipeline, the valve comprising:
    a valve body (100) having opening portions (110 and 120) formed at front and rear sides thereof, respectively;
    a front sheet (130) formed from the opening portion (110) of the front side toward an inside of the valve body (100), and a rear sheet (140) formed from the opening portion (120) of the rear side toward the inside of the valve body (100);
    an opening blind (200) installed during opening of the pipeline and a blocking blind (300) installed during blocking of the pipeline, the opening and blocking blinds (200 and 300) being inserted between the front and rear sheets (130 and 140); and
    a gear unit (400) coupled to the rear sheet (140) in a threaded manner, and configured to press the opening blind (200) or the blocking blind (300) toward the front sheet (130) by moving forward so that the opening blind (200) or the blocking blind (300) is fixed to the front sheet (130), and is sealed,
    wherein a first threaded portion (141) is formed on a side of an outer circumferential surface of the rear sheet (140), and a stepped portion (142) is formed in front of the first threaded portion (141),
    wherein the gear unit (400) includes:
        a ring gear (410) coupled to the first threaded portion (141), and configured to move forward and backward depending on rotation of the ring gear (410);
        a ring sheet (420) coupled to the ring gear (410), and configured to press the opening blind (200) or the blocking blind (300) toward the front sheet (130) by moving forward along the stepped portion (142) so that the opening blind (200) or the blocking blind (300) is fixed to the front sheet (130);
        a lever (430) formed on an outer circumferential surface of the ring gear (410), and configured to rotate the ring gear (410) by moving forward and backward; and
        a screw shaft (440) of which a first side is coupled to the lever (430), and a second side is coupled to the valve body (100) in a threaded manner, the screw shaft (440) being rotated to move the lever (430) forward and backward, thereby rotating the ring gear (410).

2. The valve of claim 1, wherein first gaskets (210 and 310) are provided on first surfaces of the opening and blocking blinds (200 and 300), respectively, the first surfaces facing the front sheet (130), and
    second gaskets (220 and 320) are provided on second surfaces of the opening and blocking blinds (200 and 300), respectively, the second surfaces facing the ring sheet (420), so that when the opening blind (200) is pressed toward the front sheet (130) by the ring sheet (420), a gap between the opening blind (200) and the front sheet (130) and a gap between the opening blind (200) and the ring sheet (420) are sealed by pressing the first gasket (210) and the second gasket (220), or when the blocking blind (300) is pressed toward the front sheet (130) by the ring sheet (420), a gap between the blocking blind (300) and the front sheet (130) and a gap between the blocking blind (300) and the ring sheet (420) are sealed by pressing the first gasket (310) and the second gasket (320).

3. The valve of claim 1, wherein a third gasket (422) is provided at a rear end of a lower surface of the ring sheet (420) so that when the opening blind (200) or the blocking blind (300) is pressed by the ring sheet (420) depending on forward movement of the ring gear (410), the ring gear (410)

presses the third gasket (422), thereby sealing a gap between the stepped portion (142) and the ring gear (410).

\* \* \* \* \*